United States Patent
Levine et al.

(10) Patent No.: US 12,400,074 B1
(45) Date of Patent: Aug. 26, 2025

(54) STATEFUL PRETRAINED TRANSFORMERS IN A GENERATIVE RESPONSE ENGINE

(71) Applicant: OpenAI OpCo, LLC., San Francisco, CA (US)

(72) Inventors: Daniel Levine, San Francisco, CA (US); Rj Marsan, San Francisco, CA (US); Boyang Niu, San Francisco, CA (US)

(73) Assignee: OpenAI OpCo, LLC, San Francisco, CA (US)

( * ) Notice: Subject to any disclaimer, the term of this patent is extended or adjusted under 35 U.S.C. 154(b) by 0 days.

(21) Appl. No.: 19/062,407

(22) Filed: Feb. 25, 2025

(51) Int. Cl.
G06F 40/20 (2020.01)

(52) U.S. Cl.
CPC .................... *G06F 40/20* (2020.01)

(58) Field of Classification Search
CPC ........................................ G06F 40/20
USPC ............................................ 704/9
See application file for complete search history.

(56) References Cited

U.S. PATENT DOCUMENTS

| | | | | |
|---|---|---|---|---|
| 12,271,360 B1 * | 4/2025 | Nguyen | ............... | G06F 16/2228 |
| 2024/0385885 A1 * | 11/2024 | Dhillon | ................ | G06F 9/5027 |
| 2024/0386347 A1 * | 11/2024 | Dhillon | ............... | G06Q 10/0633 |
| 2025/0045256 A1 * | 2/2025 | Gottlob | ................ | G06F 16/215 |

FOREIGN PATENT DOCUMENTS

| | | | | | |
|---|---|---|---|---|---|
| CN | 117252664 | A | * | 12/2023 | |
| CN | 119442028 | A | * | 2/2024 | |
| CN | 118779239 | A | * | 10/2024 | |
| CN | 118798351 | A | * | 10/2024 | |
| CN | 119179767 | A | * | 12/2024 | ......... G06F 16/3329 |
| CN | 119360317 | A | * | 1/2025 | |
| EP | 4465217 | A1 | * | 11/2024 | ........... G06F 16/248 |

* cited by examiner

*Primary Examiner* — Edwin S Leland, III
(74) *Attorney, Agent, or Firm* — Polsinelli PC

(57) ABSTRACT

Disclosed are systems, apparatuses, processes, and computer-readable media for a stateful generative pretrained transformer (GPT) in a generative response engine. The present technology includes receiving, by a generative response engine, a first user prompt from a client device, wherein the generative response engine is associated with a first state; determining, by the generative response engine using a first system prompt associated with the first state, the first user prompt corresponds to a second state different from than the first state; generating a second system prompt associated with the second state, wherein a tool of the generative response engine retrieves information associated with the second state to combine into the second system prompt; obtaining, by the generative response engine, a first response based on the first user prompt and the second system prompt associated with the second state; and providing the first response to the client device.

20 Claims, 11 Drawing Sheets

STATEFUL PRETRAINED TRANSFORMERS IN A GENERATIVE RESPONSE ENGINE

BACKGROUND

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation. Generative response engines can sift through vast amounts of text data, extract context, and provide coherent responses to a wide array of queries.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

DESCRIPTION

Figure 1:
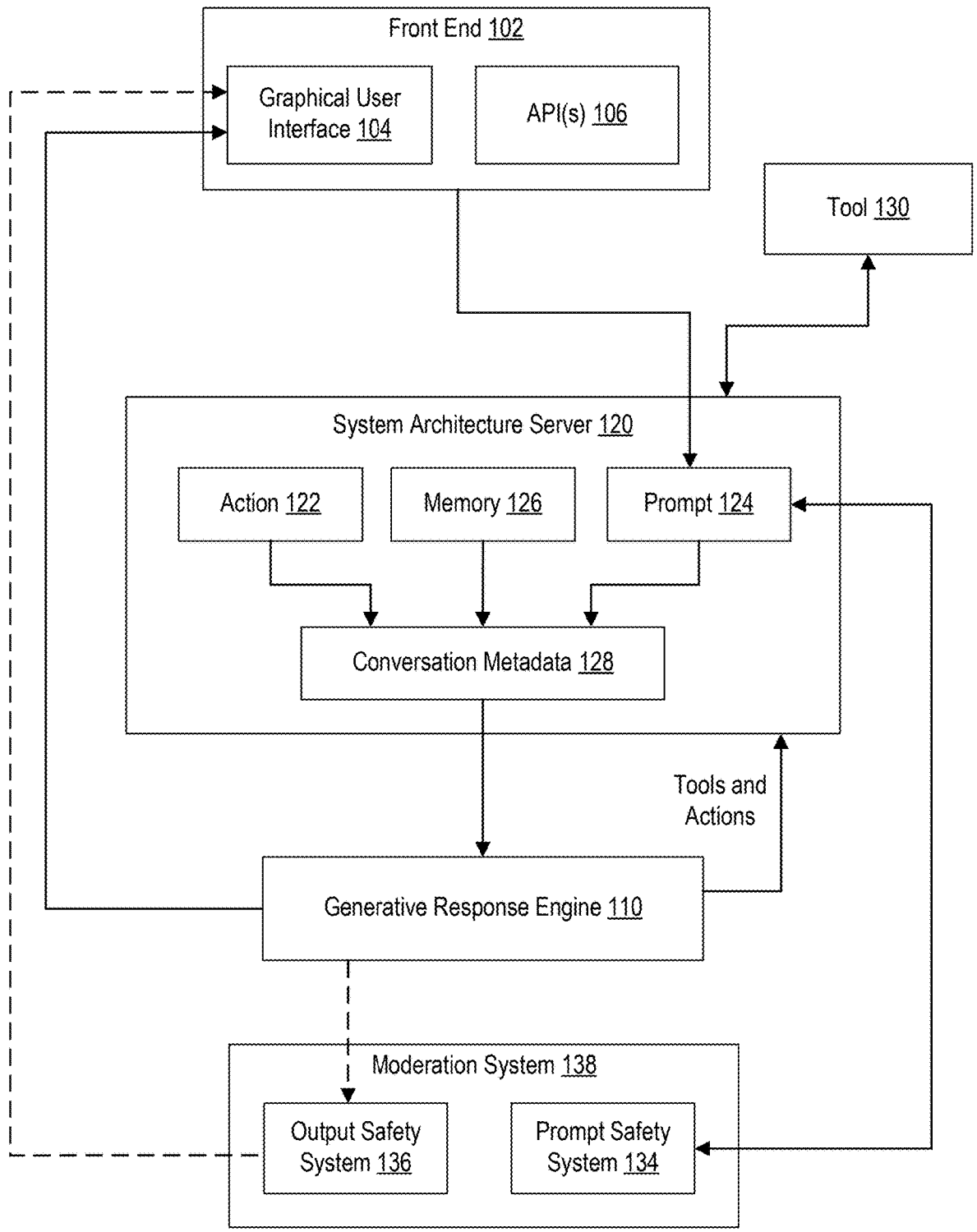
FIG. 1 illustrates an example system supporting a generative response engine during inference operations in accordance with some embodiments of the present technology.

Generative response engines such as large language models represent a significant milestone in the field of artificial intelligence, revolutionizing computer-based natural language understanding and generation. Generative response engines, powered by advanced deep learning techniques, have demonstrated astonishing capabilities in tasks such as text generation, translation, summarization, and even code generation. However, despite their remarkable linguistic prowess, these generative response engines operate on a foundation of publicly available information and do not possess personal information about individual users.

Many generative response engines provide a conversational user interface powered by a chatbot whereby the user account interacts with the generative response engine through natural language conversation with the chatbot. Such a user interface provides an intuitive format to provide prompts or instructions to the generative response engine. In fact, the conversational user interface powered by the chatbot can be so effective that users can feel as if they are interacting with a person. Some user accounts find the generative response engine effective enough that they utilize the conversational user interface powered by the chatbot as they would an assistant.

In some aspects, a generative response engine can include different front ends that can be accessed by end users to process input queries and generate detailed, context-aware responses. These capabilities are valuable for diverse use cases and may include capabilities to enhance existing business services for customers. For example, generative response engines may be used for customer support, code generation, and analyzing large volumes of data such as during discovery processes in litigation, security functions, and so forth. Generative response engines may include an application programming interface (API) to enable machine-to-machine communication to enable customers to seamlessly extend operations to use a generative response engine without having to build specialized infrastructure, corresponding machine learning models, and other infrastructure necessary.

In some aspects, a generative response engine may also be deployed with customized resources as a custom generative pretrained transformer (GPT). A custom GTP may include a customized model based on additional training. A custom GPT is tailored to specific tasks, industries, or user preferences. For example, the custom GPT may use a custom GPT model that is fine-tuned with proprietary data, configured with unique instructions, or integrated with external tools and APIs to enhance capabilities. A custom GPT is useful for automating workflows, providing personalized assistance, or generating domain-specific content. A custom GPT may adjust behavior, tone, and functionality to offer a more precise and efficient AI experience compared to general-purpose models.

Training a custom model typically involves either fine-tuning a pretrained GPT model with additional learning based on various tools, depending on the level of customization. Fine-tuning a GPT model uses a pre-trained GPT model and further trains the model based on domain-specific or proprietary data, either using a low rank adapter (LoRA) or backpropagation. In some aspects, prompt engineering can be used in a custom GTP without additional training. Prompt engineering employs very long, detailed, and structured prompts that provide structure and guide the custom GPT responses without modifying its underlying parameters. These prompts are stored within the custom GPT and allow a user to update the prompts as needed.

Prompts for custom GPTs can sometimes be too long and may cause the model to lose focus or deviate from the intended task. GPTs are stateless and do not retain memory between interactions and rely entirely on the prompt to understand context. If a prompt is overloaded with details, instructions, or background information, the model may prioritize the wrong aspects or generate responses that deviate from the main objective. Additionally, long prompts increase the chance of conflicting instructions and may result in inconsistent or unexpected outputs.

In some aspects, stateful GPTs are disclosed and include state using a dynamic prompt construction to rebuild a system prompt based on the current state. In some aspects, different states can be defined based on user operation, and the stateful GPT is configured to identify when a user prompt indicates to change state. For example, the base system prompt may include the identification of different states within the prompt, and when the stateful GPT changes to a corresponding state, the stateful GPT accesses instructions associated with that state and mutates the system prompt to include those instructions.

The stateful GPT may also remove instructions, such as when migrating between states that have different flows and requirements. For example, when a stateful GPT migrates between a customer service state to a checkout state, the portion of the system prompt related to customer service is removed to keep the prompt focused and accurate. In some cases, the stateful GPT can also be configured to add and remove states based on instructions associated with other states.

The stateful GPT may also be configured to mutate the system prompt to include deterministic data in a key-value pair array that can be appended to the system prompt. In this case, the stateful GPT can remember objective information outside of the generative response engine's contextual window and remember some details for a longer period, such as a user's name or email address.

In some aspects, a generative response engine is configured to accept multimodal inputs and can be trained to understand visual changes and could potentially implement a computer agent, which is an autonomous software program designed to perform tasks, make decisions, or provide insights on behalf of a user. Computer agents can analyze vast amounts of data, automate repetitive actions, and respond intelligently to specific triggers. For instance, a person might use a computer agent to monitor stock prices and execute trades, schedule and manage appointments, or sift through extensive datasets to find trends or anomalies. Computer agents can act on behalf of a person to perform tasks to save time, enhance efficiency, and reduce the cognitive burden of managing complex or mundane tasks.

However, deploying computer agents can pose privacy concerns, especially when they handle sensitive data such as financial transactions, personal communications, or proprietary business information. Running the agent in a remote environment (e.g., a secure cloud server) can mitigate these risks by centralizing data access within a controlled, monitored, and encrypted system. The remote environment reduces the potential for data breaches on local devices, ensures compliance with security best practices, and balances functionality and privacy. Both user and machine control inputs are important with computer agents to ensure they operate within defined parameters, align with the user instructions, and adapt to dynamic environments or specific requirements.

FIG. 1 illustrates an example system supporting a generative response engine during inference operations in accordance with some embodiments of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

The generative response engine 110 is an artificial intelligence (AI) that can generate content in response to a prompt. The prompt can be from a human or a software entity (AI or applications). The prompt is generally in natural language but could be in code, including binary. Some examples of the generative response engine can include language models that generate language, such as CHATGPT, or other models, such as DALL-E, which generates images, and SORA, which generates videos. CHATGPT, DALL-E, and SORA are all provided by OPENAI, but the generative response engine is not limited to AI provided by OPENAI. The generative response engine can also be any type of generative AI and can include AI developed using various architectures such as diffusion models and transformers (e.g., a generative pre-trained transformer) and combinations of models.

In some instances, a language model, such as CHATGPT, can receive prompts to output images, video, code, applications, etc., which it can provide by interfacing with one or more other models, as will be addressed further herein.

Users and applications can interact with the generative response engine 110 through the front end 102. The front end 102 serves as the interface and intermediary between the user and the generative response engine. It encompasses graphical user interface 104 and Application Programming Interfaces (APIs) 106 that facilitate communication, input processing, and output presentation. Generally, users interact through a graphical user interface 104 that often includes a conversational interface, and applications interact through API 106, but this is not a requirement.

The graphical user interface 104 is the platform through which users interact with the generative response engine 110. It can be a web-based chat window, a mobile application, or any interface that supports data input and output. The graphical user interface 104 facilitates a conversation between the user and the generative response engine, as the user provides prompts in the graphical user interface 104 to which the generative response engine responds and presents those responses in the graphical user interface 104. In some embodiments, graphical user interface 104 presents a conversational interface, which has attributes of a conversation thread between a user account and generative response engine 110.

The graphical user interface 104 is configured to perform input handling, context management, and output presentation. The type of inputs that can be received can be relative to the specifics of the generative response engine 110. But even when a model doesn't directly accept certain types of inputs, the front end 102 might be able to receive different types of inputs, which can be converted to inputs that are accepted by the generative response engine 110. For example, a language model is generally configured to accept text, but the front end 102 can accept voice and convert it to text or accept an image and create a textual representation.

The graphical user interface 104 is also configured to maintain the context of the conversation, which allows for coherent and relevant responses. For example, the graphical user interface 104 is responsible for providing the conversation thread and other relevant context accessible to the front end 102 to the generative response engine along with the specific prompt to the generative response engine. For example, a conversation between the user account and the generative response engine 110 can have taken several turns (prompt, response, prompt, response, etc.). When the user account provides a further prompt, the graphical user interface 104 can provide that prompt to the generative response engine in the context of the entire conversation.

In another example, the front end 102 might have access to a memory 126 where facts about the user account have been stored. In some embodiments, these facts can have been identified as facts worth storing by the generative response engine and the front end 102 has stored these facts at the direction of the generative response engine. Accordingly, these facts can be provided to the generative response engine 110 along with a user-provided prompt so that the generative response engine has access to these facts when generating a response.

In another example, the graphical user interface 104 might be configured to provide a system prompt along with a user-provided prompt. A system prompt is hidden from the user account and is used to set the behavior and guidelines for the generative response engine. It can be used to define the AI's persona, style, and constraints.

The graphical user interface 104 is also configured to display the responses from the generative response engine, which might include text, code snippets, images, or interactive elements.

In some embodiments, the generative response engine 110 can provide instructions to the front end 102 that instruct the graphical user interface 104 about how to display some of the output from the generative response engine. For example, the generative response engine can direct the graphical user interface 104 to present code in a code-specific format, or to present interactive graphics, or static images. In other examples, the generative response engine can direct the graphical user interface 104 to present an interactive document editor where the graphical user interface 104 can be presented with the document editor so that the user account and the generative response engine can collaborate on the document. In some embodiments, the generative response engine 110 can provide instructions to the front end 102 to record facts in a personalization notepad. Accordingly, the graphical user interface 104 does not always display all of the output of the generative response engine.

As noted above, the front end 102 can also provide one or more application programming interfaces (API(s)) 106. APIs enable developers to integrate the generative response engine's capabilities into external applications and services. They provide programmatic access to the generative response engine, allowing for customized interactions and functionalities.

The APIs 106 can accept structured requests containing prompts, context, and configuration parameters. For example, an API can be used to provide prompts and divide the prompt into system prompts and user prompts. In some embodiments, the APIs 106 can provide specific inputs for which the generative response engine 110 is configured to respond with a specific behavior. For example, an API can be used to specify that it requires an output in a particular format or structured output. For example, in the chat completion API, the API call can specify parameters for the output, such as the max length for the desired output, and specify aspects of the tone of the language used in the response. Some common APIs are for participating in a conversation (Chat Completion API), for providing a single response (Completion API), for converting text into embeddings (Embeddings API), etc. The API can also be used to indicate specific decision boundaries that the generative response engine 110 might be trained to interpret. For example, the moderation API can take advantage of the generative response engine's content moderation decision-making. In the case of the moderation API and others, the API might give access to services other than the generative response engine. For example, the moderation API might be an interface to moderation system 138, addressed below.

Some other common APIs include the Fine-Tuning API, which allows developers to customize models of the generative response engine using their own datasets; the Audio and Speech APIs, which cause the generative response engine to output speech or audio; and the Image Generation API, which causes the generative response engine to output images (which might require utilizing other models).

There can also be APIs that direct the generative response engine to interface with other applications or other generative AI engines. In such cases, the specific application or AI engine might be specified, or the generative response engine might be allowed to choose another application of AI engine to utilize in response to a prompt.

In short, the graphical user interface 104 and the APIs 106 can be used to provide prompts to the generative response engine. Prompts are sometimes differentiated into prompt types. For example, a system prompt can be a hidden prompt that sets the behavior and guidelines for the generative response engine. A user prompt is the explicit input provided by the user, which may include questions, commands, or information.

Sitting in between front end 102 and generative response engine 110 is a system architecture server 120. The function of system architecture server 120 is to manage and organize the flow of data among key subsystems, enabling the generative response engine 110 to generate responses that are contextually relevant, accurate, and enriched with additional information as required.

Action 122 facilitates auxiliary tasks that extend beyond basic text generation. In some embodiments, action 122 can be actions that correspond to an API 106. In some embodiments, action 122 can be agentic actions that the generative response engine 110 decides to take to carry out a user's intent as described in the prompt.

Prompt 124 is the request or command provided by the user account through front end 102. In some embodiments, prompt 124 can be further supplemented by a system prompt and other information that might be included by graphical user interface 104 or API 106. In some embodiments, prompt 124 can even be modified or enhanced by generative response engine 110 as addressed further below. Additionally, as the user account provides prompts and generative response engine 110 provides responses, a conversation thread forms. As the user account provides a new prompt, this is appended to the overall conversation and added to prompt 124. Thus, a user account might think of a first user-provided message as a first prompt and a second user-provided message as a second prompt, and so on, but prompt 124 as perceived by generative response engine 110 can include a thread of user-provided messages and responses from generative response engine 110 in a multi-turn conversation. Generally, prompt 124 will include an entire conversation thread, but in some instances, prompt 124 might need to be shortened if it exceeds a maximum accepted length (generally measured by a number of tokens).

System architecture server 120 can also route prompts and response through moderation system 138, which can be separate or part of system architecture server 120. In some embodiments, prompts are provided to prompt safety system 134 before being provided to generative response engine 110. Prompt safety system 134 is configured to use one or more techniques to evaluate prompts to ensure a prompt is not requesting generative response engine 110 to generate moderated content. In some embodiments, prompt safety system 134 can utilize text pattern matching, classifiers, and/or other AI techniques.

Since prompts can evolve over time through the course of a conversation, consisting of prompts and responses, prompts can be repeatedly evaluated at each turn in the conversation.

Memory 126 can facilitate continuity and personalization in conversations. It allows the system to maintain user-specific context, preferences, or details that may inform future interactions. A memory file can be persisted data from previous interactions or sessions that provide background information to maintain continuity. In some embodiments, memory can be recorded at the instruction of generative response engine 110 when generative response engine 110 identifies a fact or data that it determines should be saved in memory because it might be useful in later conversations or sessions.

Conversation metadata 128 can aggregate data points relevant to the conversation, including user prompt 124, action 122, and memory 126. This consolidated information package serves as the input for generative response engine 110. Conversation metadata 128 can label parts of a prompt as user provided, generative response engine provided, a system prompt, memory 126, data from action 122 or tool 130 (addressed below).

The generative response engine is the core engine that processes inputs (from system architecture server 120) and generates outputs. In some embodiments, the generative response engine is a Generative Pre-trained Transformer (GPT), but it could utilize other architectures.

A core feature of generative response engine 110 is to generate content in response to prompts. When the generative response engine 110 is a GPT, it is configured to receive inputs from front end 102 that provide guidance on a desired output. The generative response engine can analyze the input and identify relevant patterns and associations in the data, and it has learned to generate a sequence of tokens that are predicted as the most likely continuation of the input. The generative response engine 110 generates responses by sampling from the probability distribution of possible tokens, guided by the patterns observed during its training. In some embodiments, the generative response engine 110 can generate multiple possible responses before presenting the final one. The generative response engine 110 can generate multiple responses based on the input, and these responses are variations that the generative response engine 110 considers potentially relevant and coherent.

In some embodiments, the generative response engine 110 can evaluate generated responses based on certain criteria. These criteria can include relevance to the prompt, coherence, fluency, and sometimes adherence to specific guidelines or rules, depending on the application. Based on this evaluation, the generative response engine 110 can select the most appropriate response. This selection is typically the one that scores highest on the set criteria, balancing factors like relevance, informativeness, coherence, and content moderation instructions/training.

In some embodiments, an instruction provided by an API 106, a system prompt, or a decision made by generative response engine 110 can cause the generative response engine 110 to interpret a prompt and re-write it or improve the prompt for a desired purpose. For example, generative response engine 110 can determine to take a prompt to make a picture and enhance the prompt to yield a better picture. In these instances, generative response engine 110 can generate its own prompts, which can be provided to a tool 130 or provided to generative response engine 110 to yield a better output response than the original prompt might have.

The generative response engine 110 can also do more than generate content in response to a prompt. In some embodiments, the generative response engine 110 can utilize decision boundaries to determine the appropriate course of action based on the prompt. In some examples, a decision boundary might be used to cause the generative response engine to recognize that it is being asked to provide a response in a particular format such that it will generate its response constrained by the particular format. In some examples, a decision boundary can cause the model to refuse to generate a responsive output if the decision is that the responsive output would violate a moderation policy. In some examples, the decision boundary might cause the generative response engine to recognize that it needs to interface with another AI model or application to respond to the prompt. For example, when the generative response engine is a language model, it might recognize that it is being asked to output an image, and therefore, it needs to interface with a model that can output images to provide a response to the prompt. In another example, the prompt might request a search of the Internet before responding. The generative response engine can use a decision boundary to recognize that it should conduct a search of the Internet and use the results of that search in responding to the prompt. In another example, the prompt might request that the generative response engine take an agentic action on behalf of the user by interacting with a third-party service (e.g., book a reservation for me at . . . ), and the generative response engine can utilize a decision boundary to recognize that it needs to plan steps to locate the third-party service, contact the third-party service, and interact with the third-party service to complete the task and then report back to the user that the action has been completed.

When generative response engine 110 determines that it should take an agentic action on behalf of the user or it should call a tool to aid in providing a quality response to the user account, the generative response engine 110 might call a tool 130 or cause an action 122 to be performed. As indicated above, tools 130 can include internet browsers, editors such as code editors, other AI tools etc. Actions 122 are actions that the generative response engine 110 can cause to be performed, perhaps using tool 130. As used herein actions 122 should be considered to cover a broad array of actions that generative response engine 110 can perform with or without tools 130. Tools 130 are considered to cover a wide variety of services and software that encompass tools such as a computer operating system such that the generative response engine 110 can control the computer operating system on the user's behalf, to robotic actuators, to search browsers and specific applications.

Additionally, the generative response engine 110 can also generate portions of responses that are not displayed to the user. For example, the generative response engine 110 can direct the front end 102 to provide specific behaviors, such as directions for how to present the response from the generative response engine 110 to the user account. In another example, the generative response engine 110 can provide response portions dictated by an API, where portions of the response to the API might be for the consumption of the calling application but not for presentation to the end user.

In some embodiments, the output of generative response engine can be further analyzed by output safety system 136. While generative response engine 110 can perform some of its own moderation, there can be instances where it is desired to have another service review outputs for compliance with the moderation policy. The use of dashed lines in FIG. 1 differentiates a path using output safety system 136 and not using output safety system 136.

While FIG. 1 shows responses being provided back to front end 102 directly, in some embodiments, the responses might be returned by way of system architecture server 120.

Figure 2:
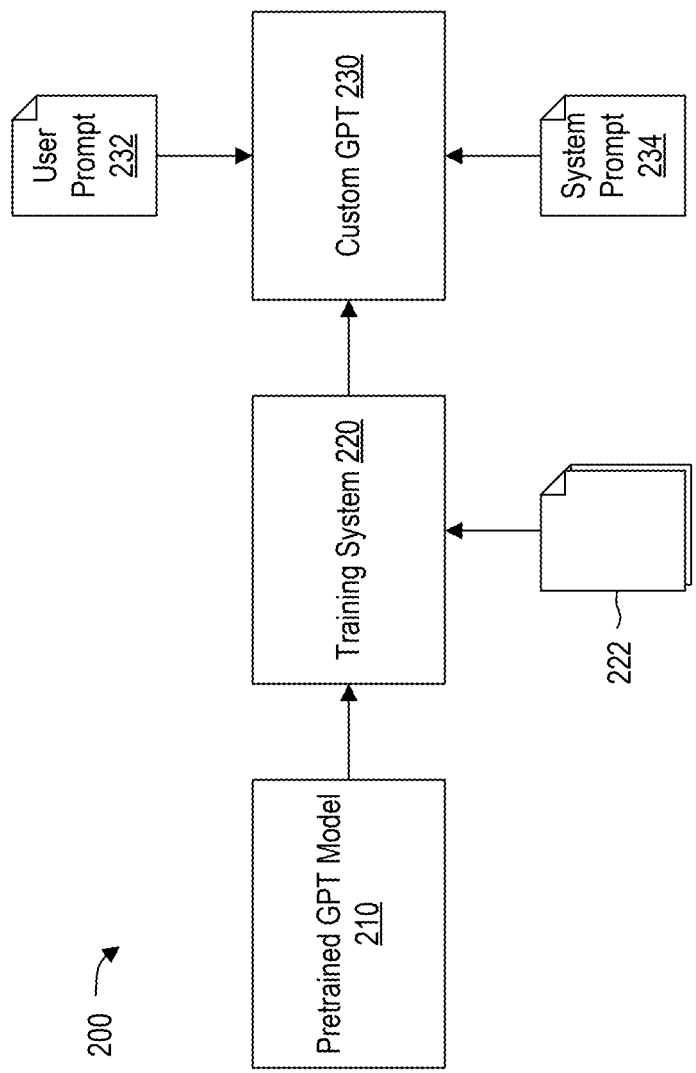
FIG. 2 is a conceptual diagram of a system for training a custom GPT in accordance with some aspects of the disclosure.

FIG. 2 is a conceptual diagram of a system 200 for training a custom GPT in accordance with some aspects of the disclosure. In some aspects, a pretrained GPT model 210 is a language model used by a generative response engine (e.g., the generative response engine 110 in FIG. 1) that has been trained on vast amounts of text data to understand and generate human-like language. The pretrained GPT model 210 is trained to learn grammar, context, reasoning patterns, and knowledge from diverse sources. The pretrained GPT model 210 performs tasks like answering questions, summarizing text, translating languages, writing code, and generating creative content. However, the pretrained GPT model 210 is trained on general information and may be insufficient for specific domains of knowledge, such as a chatbot for assisting customers with specific proprietary information.

In some aspects, the system 200 may include a training system 220 that receives training data 222 and executes a training process to cause the pretrained GPT model 210 to learn or adapt to specialized domain knowledge, resulting in a custom GPT model 230. In some aspects, a custom GPT model 230 is used in an instance of a generative response engine (e.g., the generative response engine 110) to perform various tasks, but with additional training based on the training system 220 and the received training data 222. For example, the additional training can be associated with performing real-time (using WebSockets or WebRTC) functions such as a voice-based chat agent with specific domain knowledge of a business entity's products.

One technique for fine-tuning is an adapter such as a Low-Rank Adapter (LoRA). An adapter is a lightweight trainable module that connects to different layers of a machine learning model to efficiently adapt the pretrained GPT model 210 to specific tasks with minimal computational cost and resource usage. LoRA introduces lightweight trainable modules parameterized as low-rank matrices into the model to capture task-specific information while the original model parameters remain frozen, preserving the pre-trained knowledge. Training a LoRA module involves injecting low-rank layers into key layers of the base model (e.g., attention or feedforward in a transformer model) to optimize these layers during training and reduce the number of parameters that need updating. This technique is performed to overcome the computational challenges of fine-tuning massive models, especially when working with a smaller dataset. Training a LoRA module does not modify the pretrained GPT model 210 itself and builds an extra module to execute concurrently with the pretrained GPT model 210.

Another technique for fine-tuning a pretrained GPT model 210 is fine-tuning with backpropagation. In some aspects, fine tuning by the training system 220 uses the received training data 222 and backpropagates into the pretrained GPT model 210 itself to update the weights and adapt responses to specialized tasks. Fine-tuning updates a significant portion of the model's parameters, requiring extensive computational resources, large datasets, and careful hyperparameter tuning. Fine-tuning works by feeding the pretrained GPT model 210 curated training examples, adjusting weights using backpropagation, and validating performance to ensure improved accuracy.

In some aspects, the custom GPT model 230 is configured to receive a user prompt 232 and a system prompt 234 and generate responses based on the additional learning provided by the training system 220. The custom GPT model 230 can be deployed within the generative response engine as a custom GPT for specialized tasks. The custom GPT model 230 can be integrated into various applications as designed by a third party. For example, a custom GPT model 230 can be used to deploy a chatbot that has learned a business entity's domain knowledge and understands features, products, and services offered by the business entity, allowing an end user to have a natural conversation for various business purposes. In another aspect, the custom GPT model 230 may be deployed in a real-time communication system (e.g., WebSockets, WebRTC, etc.) to, for example, act as a customer service representative.

Figure 3:
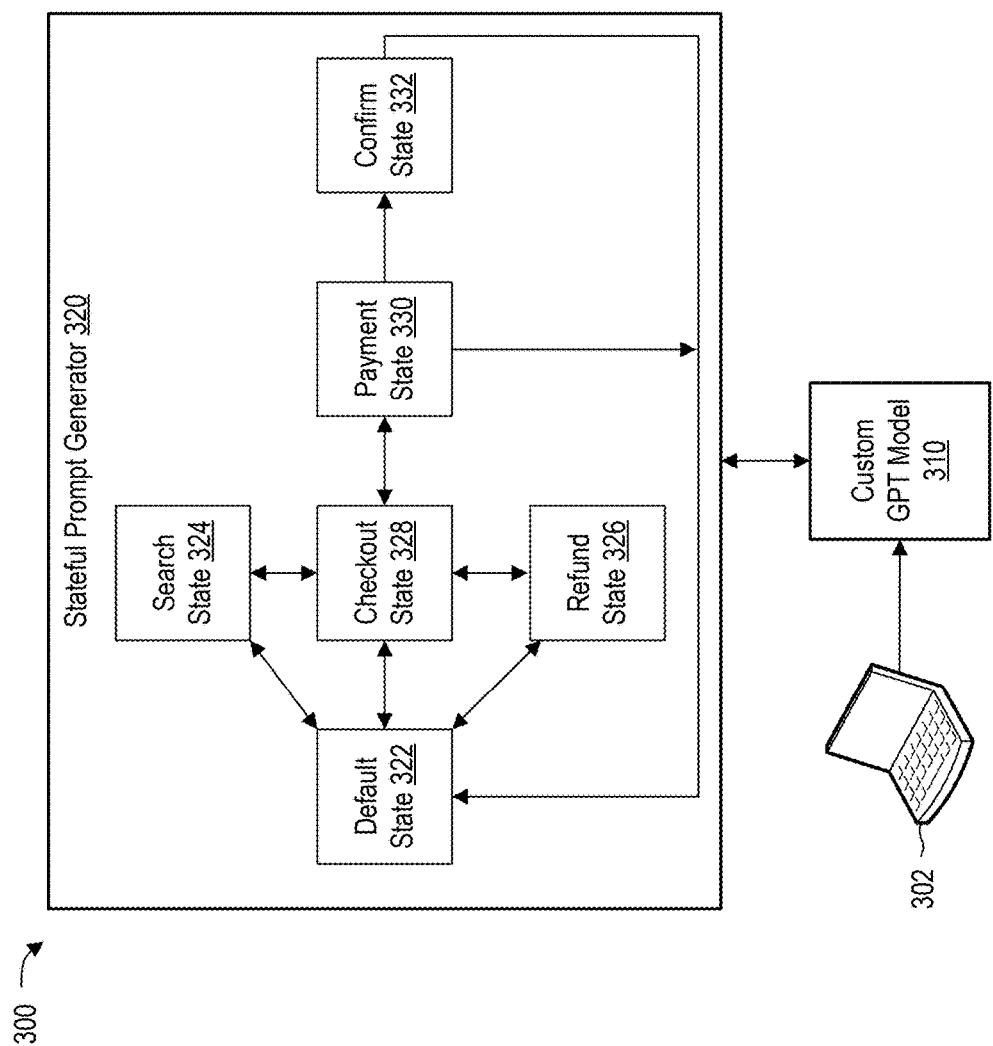
FIG. 3 is a conceptual diagram of a stateful GPT system in accordance with some aspects of the disclosure.

FIG. 3 is a conceptual diagram of a stateful GPT system 300 in accordance with some aspects of the disclosure. In some aspects, a client device 302 is configured to interact with a custom GPT model 310 which may invoke a stateful prompt generator 320. In some aspects, the custom GPT model 310 is accessed using a GPT, which is a custom instance of a generative response engine (e.g., the generative response engine 110 of FIG. 1). A stateful prompt generator 320 is an external tool that can be invoked by the custom GPT model 310 and regenerates system prompts for the custom GPT model 310. In some aspects, a tool for a generative response engine (or GPT) is an external function or API integration for additional deterministic functionality and allows the generative response engine to perform tasks like web searches, code execution, database queries, access APIs, and so forth.

In some aspects, the stateful GPT system 300 can be configured to have a plurality of states that may represent different roles within a domain or perform different tasks within the domain. In the example illustrated in FIG. 3, the stateful GPT system 300 is configured to have states representing different tasks within an e-commerce site and can help guide users. The various states include a default state 322, a search state 324 to help an end user perform a search based on learning applied to domain-specific knowledge (e.g., the training data 222 in FIG. 2), a refund state 326 for returning goods and receiving a refund, a checkout state 328 to begin the checkout process, a payment state 330 for payment authorization, and a confirmation state 332. The states illustrated are examples for purposes of explanation.

In some aspects, the custom GPT model 310 may identify when a prompt has requested the custom GPT model 310 to adopt a different state. For example, in the e-commerce example, the custom GPT model 310 can analyze the user prompt (from the client device 302) to determine whether the input request, such as "I would like to return my recent order" into a chat agent, causes the custom GPT model 310 to adopt a different state. In the event the custom GPT model 310 identifies a new state is requested, the custom GPT model 310 may request a updated system prompt from the stateful prompt generator 320. A system prompt is a predefined instruction that sets the behavior, tone, and constraints of the AI.

In some aspects, the stateful prompt generator 320 is a low code approach to implement state in a custom GPT model 310 based on mutating a default system prompt corresponding to each state. For example, each of the search state 324, the refund state 326, the checkout state 328, the payment state 330, and the confirmation state 332 have a corresponding prompt that is derived from a default system prompt associated with the default state 322. The stateful prompt generator 320 is configured to receive instructions from the custom GPT model 310 regarding transitioning to a different state and then generates a system prompt based on the instructions.

In some aspects, the stateful prompt generator 320 implicitly enforces the logical flow based on the generation of the system prompt. In some aspects, the base system prompt is configured to identify different states. In response to instructions from the custom GPT model 310 to move to a different state, the stateful prompt generator 320 retrieves instructions associated with that different state and combines the instructions with the system prompt. In aspects further described below, the base system prompt and the stateful instructions associated with different states can controlled through a user interface and stored in a manner accessible to the custom GPT.

In some aspects, the stateful prompt generator 320 retrieves and combines base the instructions with the base system prompt to generate a prompt associated with the next state. In some cases, the combination can be performed based on an interpolation (e.g., replacing a placeholder in the default system prompt with the stateful instructions). In other cases, the combination can be a rebase operation, which tracks changes (e.g., also known as commits) to a data object (e.g., the default system prompt) and applies or moves the changes to generate a stateful system prompt.

The stateful prompt generator 320 is also configured to implicitly route the custom GPT model 310 between different states. For example, the different states can be represented as a state diagram (e.g., a graph). For example, the stateful GPT model 304 in FIG. 3 is an e-commerce agent that includes a checkout and payment confirmation flow (e.g., the checkout state 312, the payment state 314, and the confirmation state 316). Access to the payment state 314 is only achievable through the checkout state 312. The movement from the payment state 314 to the confirmation state 316 is a unidirectional flow because the payment is a non-recurring charge. In this manner, the custom GPT model 310 can be configured to have different states for corresponding tasks while maintaining a consistent interface based on features in the system prompt that do not change. The base system prompt provides the overall constraints of the custom GPT model 310, and the stateful prompt generator 320 selectively adds different features to the base system prompt to create different states (e.g., the search state 324, the refund state 326, the checkout state 328, the payment state 330, and the confirmation state 332).

In some aspects, the stateful prompt generator 320 allows specialized configuration of prompts corresponding to specific states. In this manner, the base system prompt is not overloaded with extraneous detail (e.g., includes both refund instructions, checkout instructions, payment instructions, etc.), which may cause the custom GPT model 310 to prioritize the wrong aspects or generate responses that drift from the main objective. Additionally, long prompts increase the chance of conflicting instructions, leading to inconsistent or unexpected outputs.

In addition, the stateful prompt generator 320 may include a key-value store to create a memory effect. For example, the prompts (or instructions) may include generic references to a particular concept, such as a name or an email address. For example, a particular placeholder can indicate a key (e.g., <key> or {key}), which maps to a specific immutable concept (e.g., the person's name, the person's email, etc.). In some aspects, the key-value store can be configured on the current system prompt.

In some cases, the stateful prompt generator 320 can also trigger changes to a client application or changes to output that indicate a state change. For example, the stateful prompt generator 320 may provide the custom GPT model 310 information to output real time audio (e.g., during a natural language conversation with a real-time API) in different voices based on the state. For example, in the product search state, the custom GPT model 310 can output a male voice and in a checkout state, the 310 can output a female voice. In some aspects, the stateful prompt generator 320 (or the custom GPT model 310) may output a state information to the client application to change an appearance of an application (e.g., changing a header to indicate state, changing a color to indicate a holiday event, etc.), an avatar, and so forth.

Figure 4:
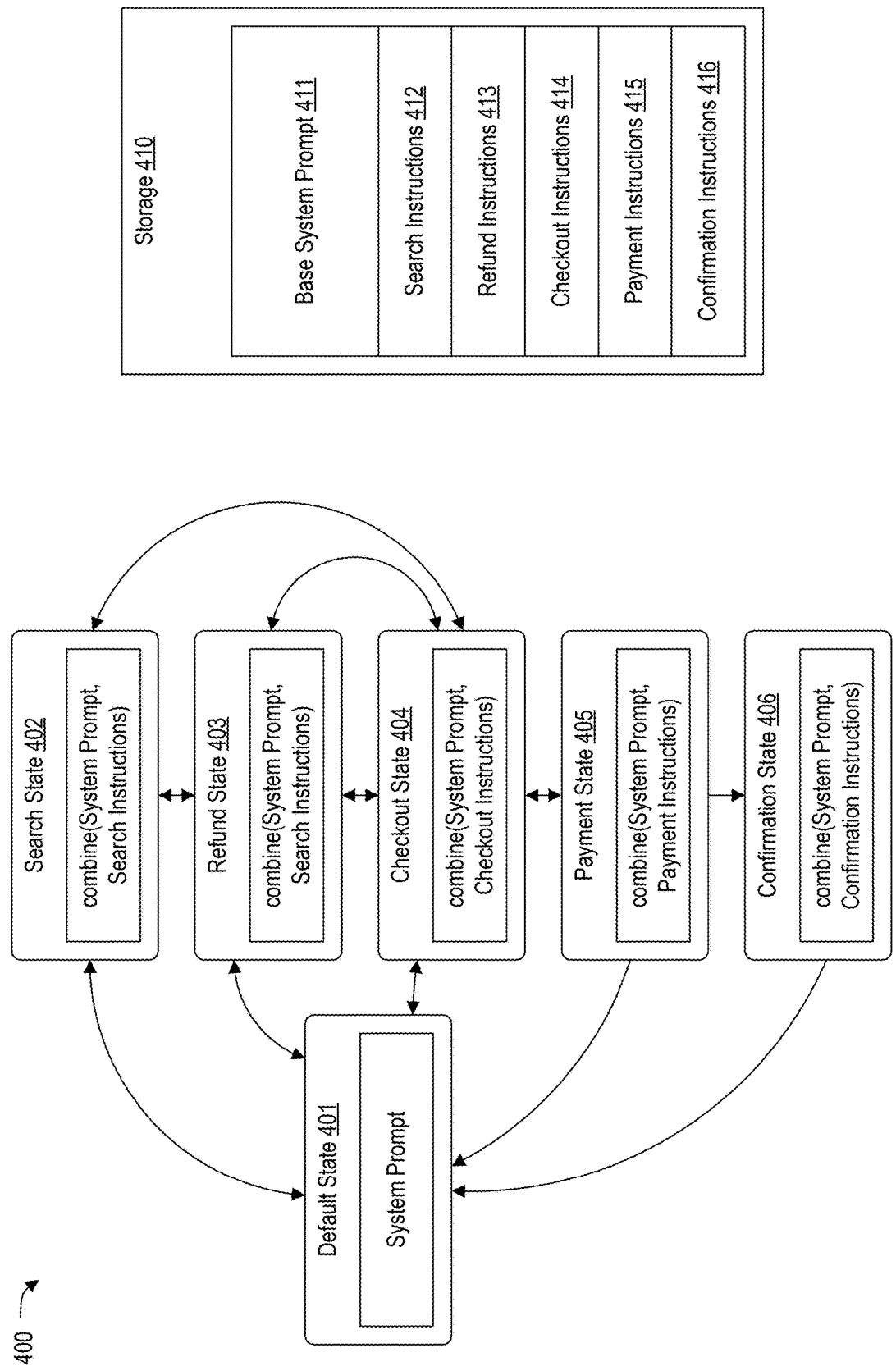
FIG. 4 is a state diagram of an example custom GPT and generation of the system prompt based on state in accordance with some aspects of the disclosure.

FIG. 4 is a state diagram 400 of an example custom GPT model (e.g., the custom GPT model 310) and generation of the system prompt based on the state in accordance with some aspects of the disclosure. In particular, the state diagram 400 illustrates an example of a stateful GPT model for an e-commerce application including a default state 401, a search state 402, a refund state 403, a checkout state 404, a payment state 405, and a confirmation state 406. FIG. 4 is merely an example for purposes of explanation. The states that can be represented by the state diagram 400 are based on the particular deployment requirements of the custom GPT model.

In some aspects, storage 410 can store different information to generate the system prompt. For example, the storage 410 may store a base system prompt 411, search instructions 412, refund instructions 413, checkout instructions 414, payment instructions 415, and confirmation instructions 416. A stateful prompt generator (e.g., the stateful prompt generator 320 in FIG. 3) is configured to generate different system prompts corresponding to the different state using the information in the storage 410. In some aspects, the stateful prompt generator, based on instructions from the custom GPT model, is configured to retrieve information from the storage 410 and combine with a system prompt 411 to generate the current state.

For example, a custom GPT includes a default state 401 corresponding to the system prompt. An example of a base system prompt 411 for the e-commerce application is illustrated below in Table 1.

TABLE 1

{
"role": "system",
"prompt": 'You are an e-commerce agent chatbot and your role is to help users to search and buy goods offered for sale. You should have a friendly conversational tone and keep your answers to any questions as short, and direct as possible.

TABLE 1-continued

```
Do not use any product codes or special identifiers in any responses when
providing responses.
...
You are configurable into additional different states defined below:
* The "search" state is for searching different products and the different ways
you can search.
* The "refunds" state is for returning a product and receiving a refund.
* The "checkout" state is for reviewing your cart and shipping information
* The "payment" state is for providing payment information
* The "confirmation" state provides an alert regarding the transaction
ALWAYS keep this state information in the prompt.
...
,
}
```

In the system prompt illustrated in Table 1, the system prompt identifies the different states by name, which can be mapped to the corresponding instructions configured in a user interface. For example, a dynamic user interface allows adding, removing, and editing different states associated with the custom GPT model. When the custom GPT model receives a user prompt such as "I am looking for home improvement items," the custom GPT can determine that the user prompt is a request that causes the custom GPT model to enter the "search" state. For example, the custom GPT model may invoke the stateful prompt generator to enter the "search" state based on the current system prompt. The stateful prompt generator then retrieves the search instructions 412 corresponding to the search state from storage. An example of the search instructions 412 is illustrated below in Table 2.

TABLE 2

```
{
  "search": 'You are in the "search" state. Here are the instructions for the search
state:
There are three different types of searches. The first type of search is a keyword
search using logical operators. The second type of search is a regular
expression-based search, which you can help the user formulate a response. The
third type is a semantic search.
...
You should always ask for the items are looking for, or ask me for more
information about specific types of searching.'
}
```

The stateful prompt generator combines the search instructions 412 with the system prompt 411 (e.g., combine (system prompt, search instructions) to generate an updated system prompt. For example, the custom GPT model is deemed to be in the search state 402 based on the updated system prompt including the search instructions.

In some aspects, the custom GPT model receives the updated system prompt and is configured to run the user prompt with the updated system prompt. That is, the stateful prompt generator is invoked during inference of a user prompt, generates an updated system prompt, stops the user prompt, and then executes the inference operation of the user prompt with the updated system prompt.

In addition, the stateful prompt generator may include a key-value store to create a memory effect for stateful content (e.g., a person's name, an email address, a category, or products being searched for). For example, the prompts (or instructions) may include generic references to a particular concept, such as a name or an email address. For example, a particular placeholder can indicate a key (e.g., <key> or {key}), which maps to a specific concept into the system prompt.

In some aspects, the state diagram 400 illustrates the various states and how the base system prompt 411 is combined with the various instructions 412-416 to derive the various states 402-406. In some aspects, the combining can be performed via interpolations using placeholder values. In other cases, the combination is a rebase operation which tracks changes (e.g., also known as commits) to a data object and applies or moves the changes to generate a stateful system prompt. For example, in the event the combination is a rebase operation, the combining process can add and remove instructions in the same step to prevent any instructions associated with a prior state from remaining in the system prompt. For example, when the custom GPT model transitions from the search state 402 to the checkout state 404, the rebase operation removes the search instructions 412 and inserts the checkout instructions 414 instructions. In some cases, changes may be more complicated because instructions between different states may need to persist, such as allowing a user in a payment state to return to the checkout state.

Figure 5A:
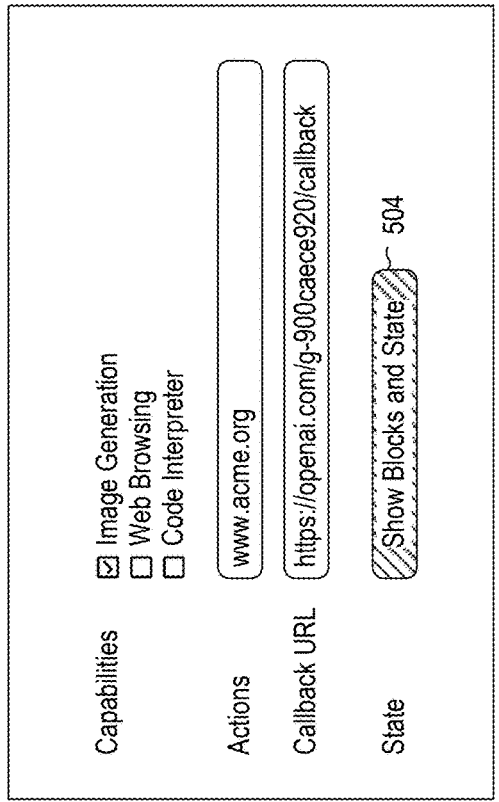
FIGS. 5A-5F illustrate screenshots of a user interface for configuring states in a custom GPT model in accordance with some aspects of the disclosure.

FIG. 5A illustrates a configuration user interface associated with a custom GPT model that is presented when a user selects to view details of the custom GPT model. The configuration user interface includes a system prompt control 502 for providing a base system prompt. In some aspects the system prompt control 502 allows the custom GPT to interact with various external services and APIs, such as fetching data based on an API request (getLoggedInActivity, etc.).

Figure 5B:
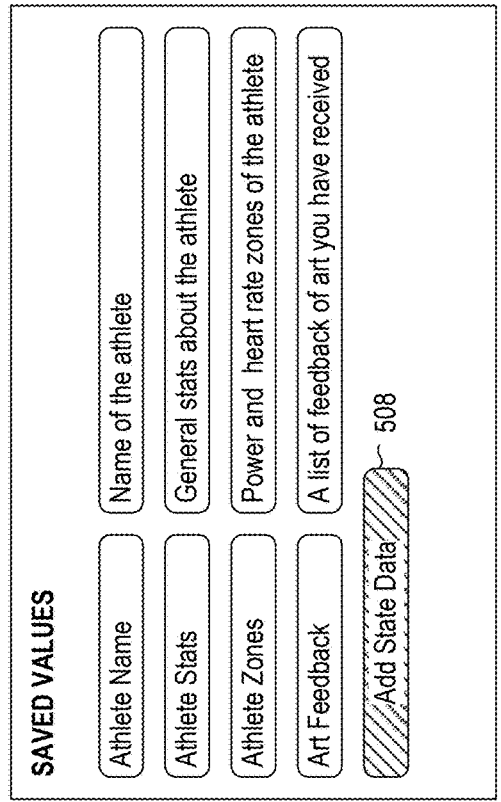

FIG. 5B illustrates a further view of a configuration user interface associated with a custom GPT model and includes options regarding various capabilities that the custom GPT may include, such as image generation. The user interface includes a button 504 for showing blocks and state to allow customization of state without writing any code.

Figure 5C:
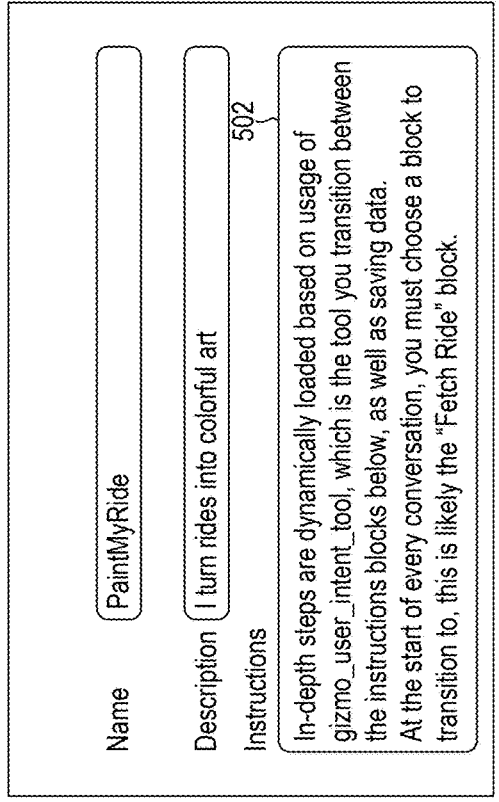

FIG. 5C illustrates a view of the state (e.g., by depressing on the button 504) and illustrates three different states associated with the custom GPT. In some aspects, the user interface includes a control 506 for inserting text information to name a state (e.g., based on the initial text) and further providing instructions associated with that state.

Figure 5D:
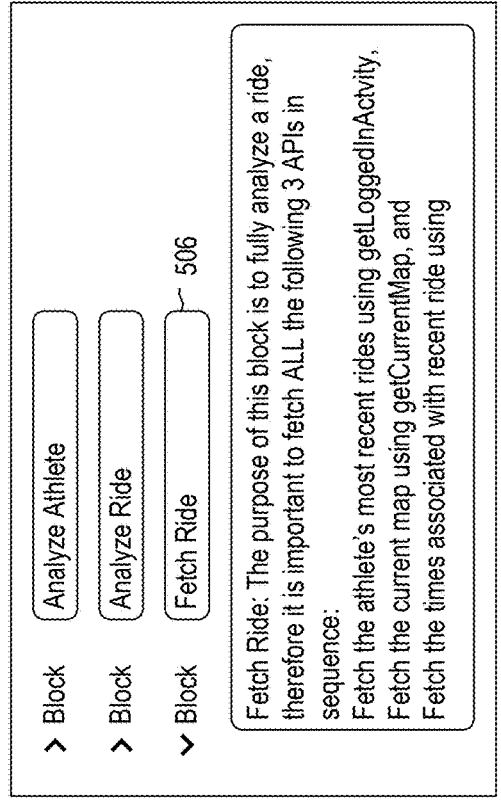

FIG. 5D illustrates another view of persistent values (e.g., by depressing the button 504) associated with the custom GPT model. In some aspects, the user interface includes a control 508 for adding stateful data based on key-value pairs. In FIG. 5D, the keys are illustrated (Athlete name, athlete stats, etc.) and a description of the key is provided. In some aspects, the values are mapped into the keys by the tool based on the description of the key, allowing the custom GPT model to persist information outside of its contextual window.

Figure 5F:
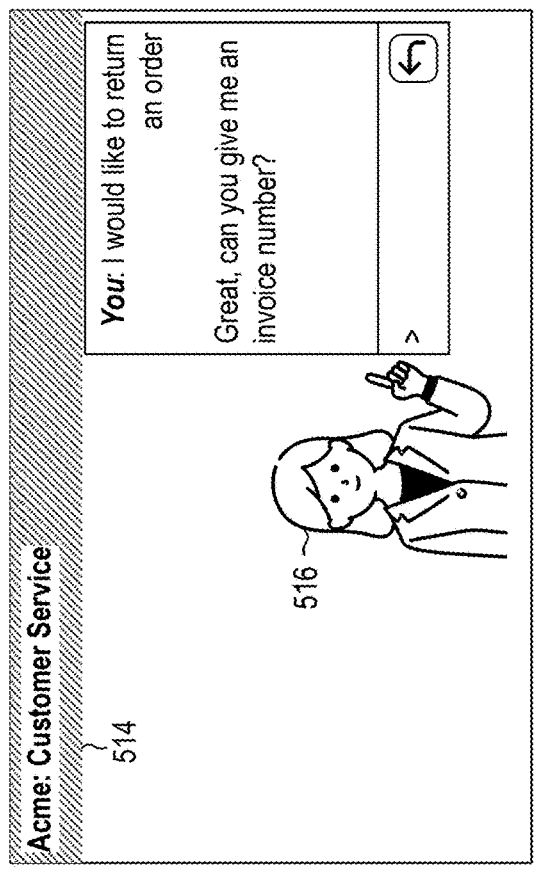
Figure 5E:
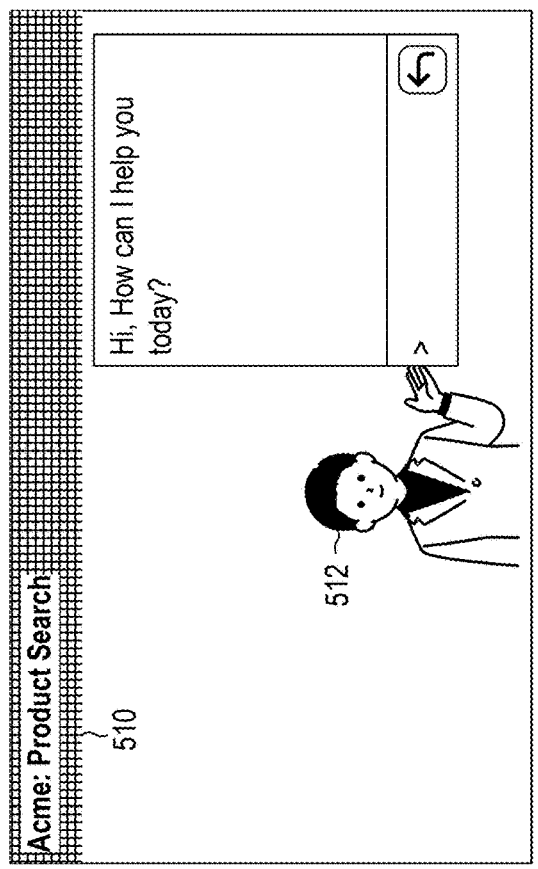

FIG. 5E illustrates an example of a client application that is rendered in conjunction with a service that uses a generative response engine through an API interface. A header 510 can illustrate a current state and an avatar 512 representing a customer service agent may be displayed to provide various output such as text. In some cases, the different header 514 may also include multimodal output such as a video and a male voice.

FIG. 5F illustrates that the client application may change its user interface and presentation on information based on a state change. In this case, the generative response engine may detect shifting from a product search state to a customer service state as illustrated by the different header 514. In addition, a different avatar 516 may be displayed having a different multimodal output (e.g., a different speaking voice). A user can interact with the client application and readily understand the different states. In some aspects, the client application may be a real time application, such as a voice-enabled customer service application, and allow the user to interact with the client application and the generative response engine using voice input. Shifting from avatar 512 to avatar 516 is similar to personal experience and provides an intuitive interface to help users interact with the generative response engine.

In some aspects, the user interfaces illustrated in FIGS. 5A-5D illustrate a technique to allow users to define states and provide sufficient context for the custom GPT to perform the task. This allows the user to provide as many states as needed for the custom GPT to perform tasks efficiently and effectively.

Figure 6:
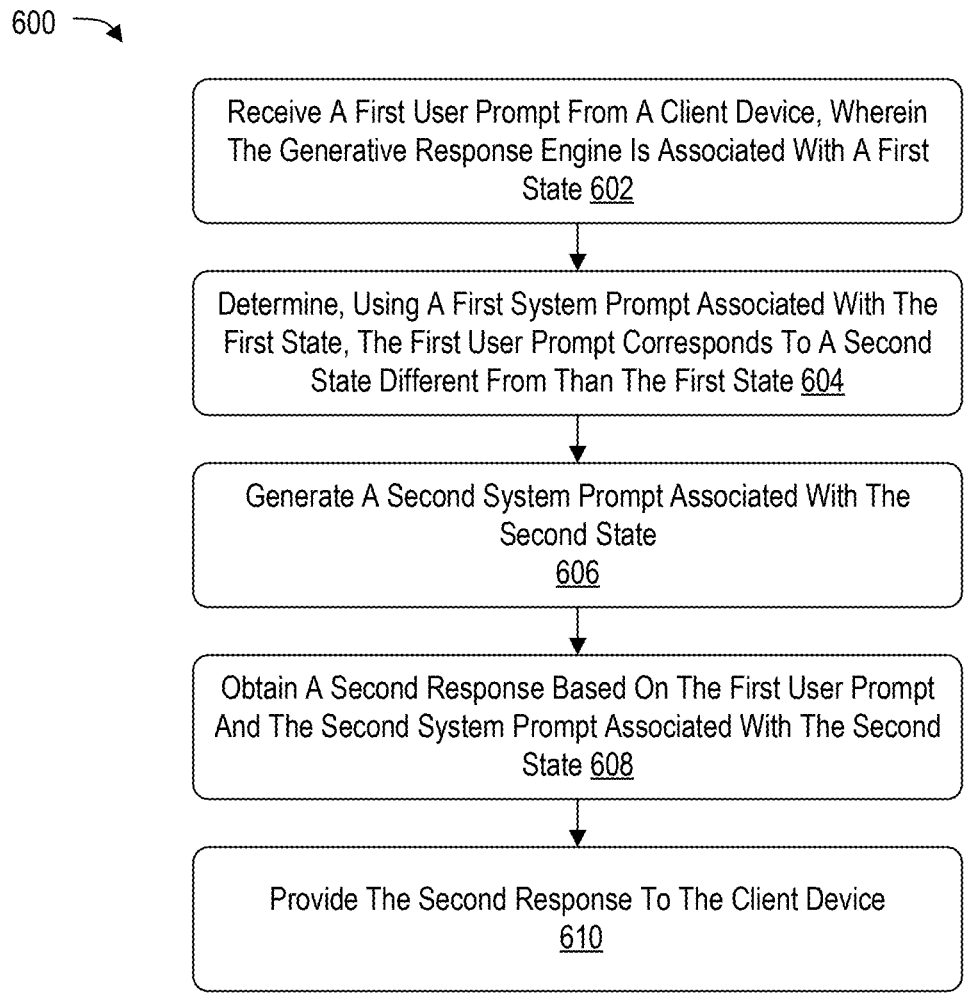
FIG. 6 is a flow diagram of a process for creating states in a custom GPT model of a generative response engine in accordance with some aspects of the disclosure.

FIG. 6 is a flow diagram of a process 600 for creating states in a custom GPT model of a generative response engine in accordance with some aspects of the disclosure. The process 600 can be performed by a computing device (or apparatus) or a component (e.g., one or more chipsets, a system-on-chip (SoC), one or more processors such as one or more central processing units (CPUs), graphics processing units (GPUs), digital signal processors (DSPs), neural processing units (NPUs), neural signal processors (NSPs), microcontrollers, ASICs, FPGAs, programmable logic devices, discrete gates or transistor logic components, discrete hardware components, etc., an ML system such as a neural network model, any combination thereof, and/or other component or system) of the computing device. The operations of process 600 may be implemented as software components that are executed and run on one or more processors (e.g., CPU, GPU, DSP, NPU or neural engine, SoC, the processor 904 of FIG. 9, and/or other processor(s)). In some aspects, the computing system may be part of a generative response engine and configured to operate in conjunction with a custom GPT model.

At block 602, the computing system may receive a first user prompt from a client device. The generative response engine may be presently associated with a first state at block 602.

At block 604, the computing system may determine, using a first system prompt associated with the first state, that the first user prompt corresponds to a second state different from the first state. For example, while processing and prior to forming a complete response, the computing system determines a second state of the custom GPT model associated with the generative response engine should handle the first user prompt.

At block 606, the computing system may generate a first system prompt associated with the second state. In some aspects, a tool of the generative response engine retrieves information associated with the second state to generate the second system prompt. For example, the information associated with the second state includes second instructions specific to the second state. The tool may, as part of block 606, insert second instructions associated with the second state into the first system prompt based on a reference to the second state in the first system prompt. The reference to the second state is some text or other identifier the tool recognizes corresponds to the second state.

In some aspects, as part of block 606, the computing system may remove the first instructions associated with the first state from the first system prompt. In this way, the current system prompt maintains instructions only relevant to its current state.

In some aspects, the additional instructions incorporated into the second system prompt can include additional instructions related to accessing of state. For example, the second instructions may include instructions related to accessing a third state. In this example, the third state may not be accessible from the first state. For example, the second state corresponds to a checkout state and is the only state that can access a payment state (e.g., the third state).

At block 608, the computing system may obtain a second response based on the first user prompt and the second system prompt associated with the second state. For example, the inference of the first user prompt is stopped as part of block 608, and a first user prompt is executed again with the second system prompt.

At block 610, the computing system may provide the first response to the client device. In some aspects, the computing system can then generate responses specific to the second state based on the second instructions. For example, the computing system may receive a second user prompt and obtain, from the generative response engine, a second response based on the second user prompt and the second system prompt. In this case, the second response is a task associated with the second state.

In some aspects, as part of block 610, the first response may include state change information to indicate the client device to update a user interface. For example, an application (e.g., a web browser executing a JavaScript bundle, a mobile application or desktop executing a cross-platform rendered user interface, etc.) may update its appearance to provide an express notice that the application has shifted states and is expecting different types of input. In one example, the state change information can be separately provided to the client device from the first response.

In some aspects, the responses may be associated with a real time function, such as a customer service application. In some cases, the output of the computing system can be associated with different qualities that indicate a different persona. For example, a customer service representative may have a different voice than an account representative in the case of a pure voice mode application (e.g., a phone call to customer service). In this case, the subtle shifts in voice quality help a user understand that the different states. In some aspects, the responses can include video as well with different characters (e.g., avatars) being rendered at the client device based on the state.

In some aspects, the tool may also be configured to enable persistent values. For example, the first system prompt and the second system prompt include key-value pairs, and the tool is configured to check each key-value pair for value changes when invoked. The tool updates the value changes and appends the key-value pairs to the system prompt. In some aspects, the generative response engine can refer to the key-value pairs and place values from the key-value pairs into a response. In this manner, the system prompt also maintains a state for values as well and can improve the operation of the custom GPT model.

Figure 7:
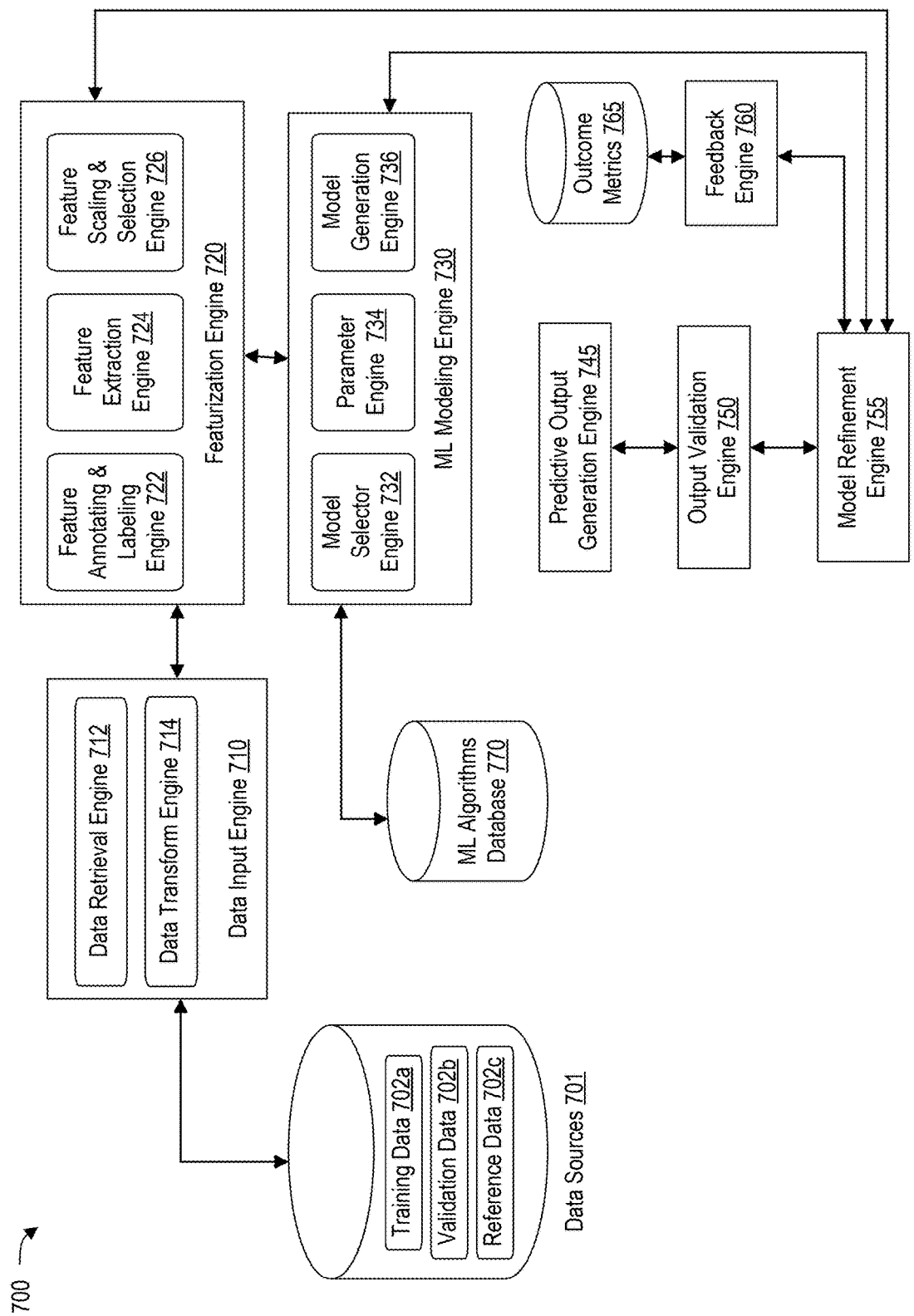
FIG. 7 is a block diagram illustrating an example machine learning platform for implementing various aspects of this disclosure in accordance with some aspects of the present technology.

FIG. 7 is a block diagram illustrating an example machine learning platform for implementing various aspects of this disclosure in accordance with some aspects of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

System 700 may include data input engine 710 that can further include data retrieval engine 712 and data transform engine 714. Data retrieval engine 712 may be configured to access, interpret, request, or receive data, which may be adjusted, reformatted, or changed (e.g., to be interpretable by another engine, such as data input engine 710). For example, data retrieval engine 712 may request data from a remote source using an API. Data input engine 710 may be configured to access, interpret, request, format, re-format, or receive input data from data sources(s) 701. For example, data input engine 710 may be configured to use data transform engine 714 to execute a re-configuration or other change to data, such as a data dimension reduction. In some embodiments, data sources(s) 701 may be associated with a single entity (e.g., organization) or with multiple entities. Data sources(s) 701 may include one or more of training data 702a (e.g., input data to feed a machine learning model as part of one or more training processes), validation data 702b (e.g., data against which at least one processor may compare model output with, such as to determine model output quality), and/or reference data 702c. In some embodiments, data input engine 710 can be implemented using at least one computing device. For example, data from data sources(s) 701 can be obtained through one or more I/O devices and/or network interfaces. Further, the data may be stored (e.g., during execution of one or more operations) in a suitable storage or system memory. Data input engine 710 may also be configured to interact with a data storage, which may be implemented on a computing device that stores data in storage or system memory.

System 700 may include featurization engine 720. Featurization engine 720 may include feature annotating and labeling engine 722 (e.g., configured to annotate or label features from a model or data, which may be extracted by feature extraction engine 724), feature extraction engine 724 (e.g., configured to extract one or more features from a model or data), and/or feature scaling and selection engine 726. Feature scaling and selection engine 726 may be configured to determine, select, limit, constrain, concatenate, or define features (e.g., AI features) for use with AI models.

System 700 may also include machine learning (ML) ML modeling engine 730, which may be configured to execute one or more operations on a machine learning model (e.g., model training, model re-configuration, model validation, model testing), such as those described in the processes described herein. For example, ML modeling engine 730 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 702a) through a machine learning model process (e.g., a training process). In some embodiments, different epochs may have different degrees of supervision (e.g., supervised, semi-supervised, or unsupervised). Data into a model to train the model may include input data (e.g., as described above) and/or data previously output from a model (e.g., forming a recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, billions, or even trillions of model parameters. ML modeling engine 730 may include model selector engine 732 (e.g., configured to select a model from among a plurality of models, such as based on input data), parameter engine 734 (e.g., configured to add, remove, and/or change one or more parameters of a model), and/or model generation engine 736 (e.g., configured to generate one or more machine learning models, such as according to model input data, model output data, comparison data, and/or validation data).

In some embodiments, model selector engine 732 may be configured to receive input and/or transmit output to ML algorithms database 770. Similarly, featurization engine 720 can utilize storage or system memory for storing data and can utilize one or more I/O devices or network interfaces for transmitting or receiving data. ML algorithms database 770 may store one or more machine learning models, any of which may be fully trained, partially trained, or untrained. A machine learning model may be or include, without limitation, one or more of (e.g., such as in the case of a meta-model) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a diffusion model, a diffusion-transformer model, an encoder such as BERT (Bidirectional Encoder Representations from Transformers) or LXMERT (Learning Cross-Modality Encoder Representations from Transformers), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein. Some of the ML algorithms in ML algorithms database 770 can be considered generative response engines. Generative response engines are those models are commonly referred to as Generative AI, and that can receive an input prompt and generate additional content based on the prompt. GPTs, diffusion models, and diffusion-transformer models are some non-limiting examples of generative response engines. Some specific examples of generative response engines that can be stored in the ML algorithms database 770 include versions DALL-E, CHAT GPT, and SORA, all provided by OPEN AI.

System 700 can further include predictive output generation engine 745 and output validation engine 750 (e.g., configured to apply validation data to machine learning model output). Predictive output generation engine 745 can analyze the input and identify relevant patterns and associations in the data it has learned to generate a sequence of words that predictive output generation engine 745 predicts is the most likely continuation of the input using one or more models from the ML algorithms database 770, aiming to provide a coherent and contextually relevant answer. Predictive output generation engine 745 generates responses by sampling from the probability distribution of possible words and sequences, guided by the patterns observed during its training. In some embodiments, predictive output generation engine 745 can generate multiple possible responses before presenting the final one. Predictive output generation engine 745 can generate multiple responses based on the input, and these responses are variations that predictive output generation engine 745 considers potentially relevant and coherent. Output validation engine 750 can evaluate these generated responses based on certain criteria. These criteria can include relevance to the prompt, coherence, fluency, and sometimes adherence to specific guidelines or rules, depending on the application. Based on this evaluation, output validation engine 750 selects the most appropriate response. This selection is typically the one that scores highest on the set criteria, balancing factors like relevance, informativeness, and coherence.

System 700 can further include feedback engine 760 (e.g., configured to apply feedback from a user and/or machine to a model) and model refinement engine 755 (e.g., configured to update or re-configure a model). In some embodiments, feedback engine 760 may receive input and/or transmit output (e.g., output from a trained, partially trained, or untrained model) to outcome metrics database 765. Outcome metrics database 765 may be configured to store output from one or more models and may also be configured to associate output with one or more models. In some embodiments, outcome metrics database 765, or other device (e.g., model refinement engine 755 or feedback engine 760), may be configured to correlate output, detect trends in output data, and/or infer a change to input or model parameters to cause a particular model output or type of model output. In some embodiments, model refinement engine 755 may receive output from predictive output generation engine 745 or output validation engine 750. In some embodiments, model refinement engine 755 may transmit the received output to featurization engine 720 or ML modeling engine 730 in one or more iterative cycles.

The engines of system 700 may be packaged functional hardware units designed for use with other components or a part of a program that performs a particular function (e.g., of related functions). Any or each of these modules may be implemented using a computing device. In some embodiments, the functionality of system 700 may be split across multiple computing devices to allow for distributed processing of the data, which may improve output speed and reduce computational load on individual devices. In some embodiments, system 700 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 700 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

Figure 8A:
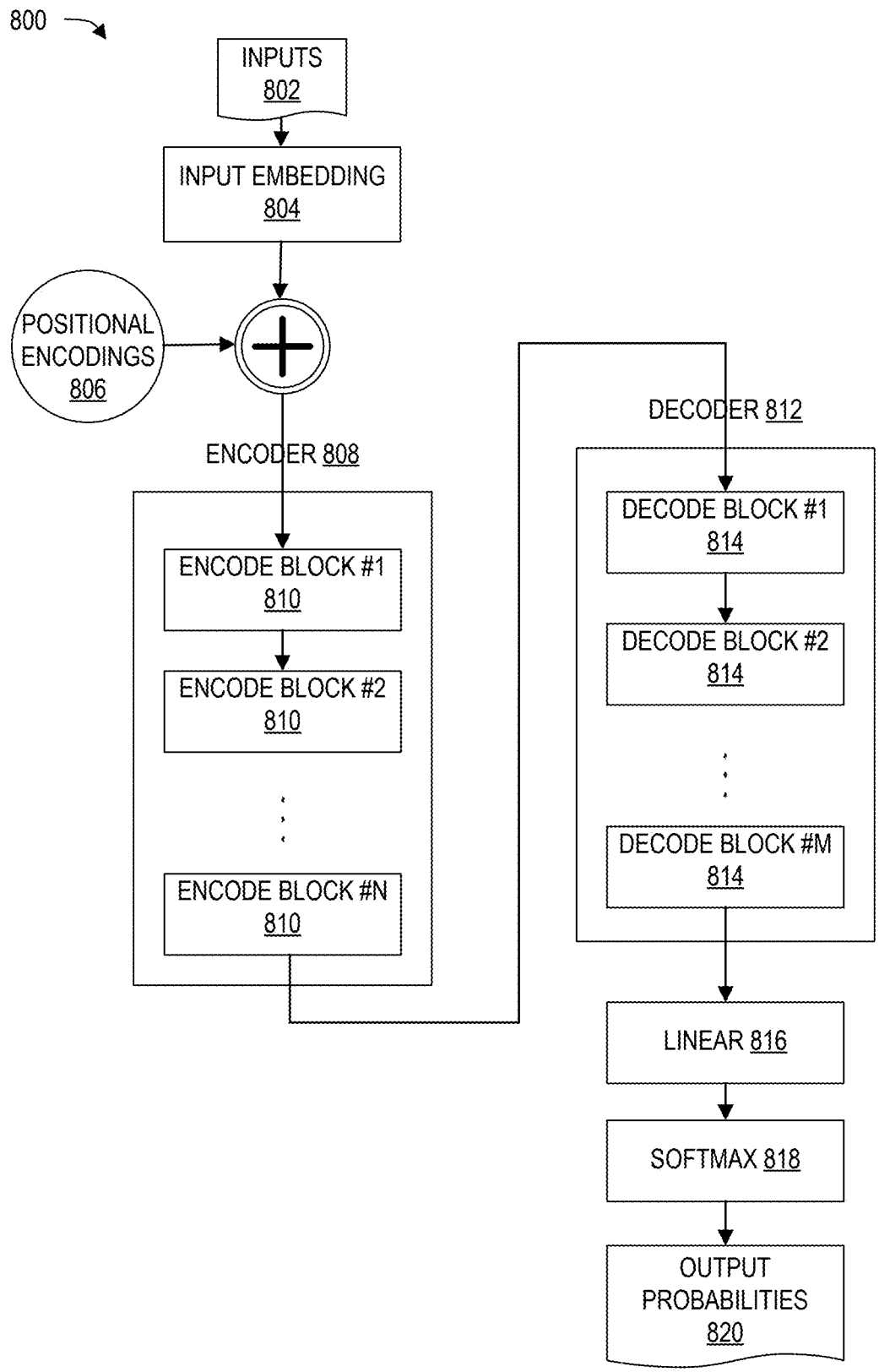
FIG. 8A, FIG. 8B, and FIG. 8C illustrates an example transformer architecture in accordance with some embodiments of the present technology.
Figure 8B:
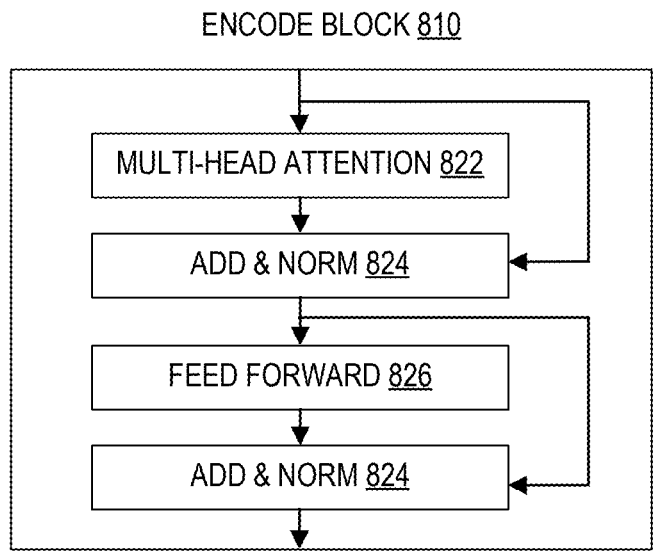
Figure 8C:
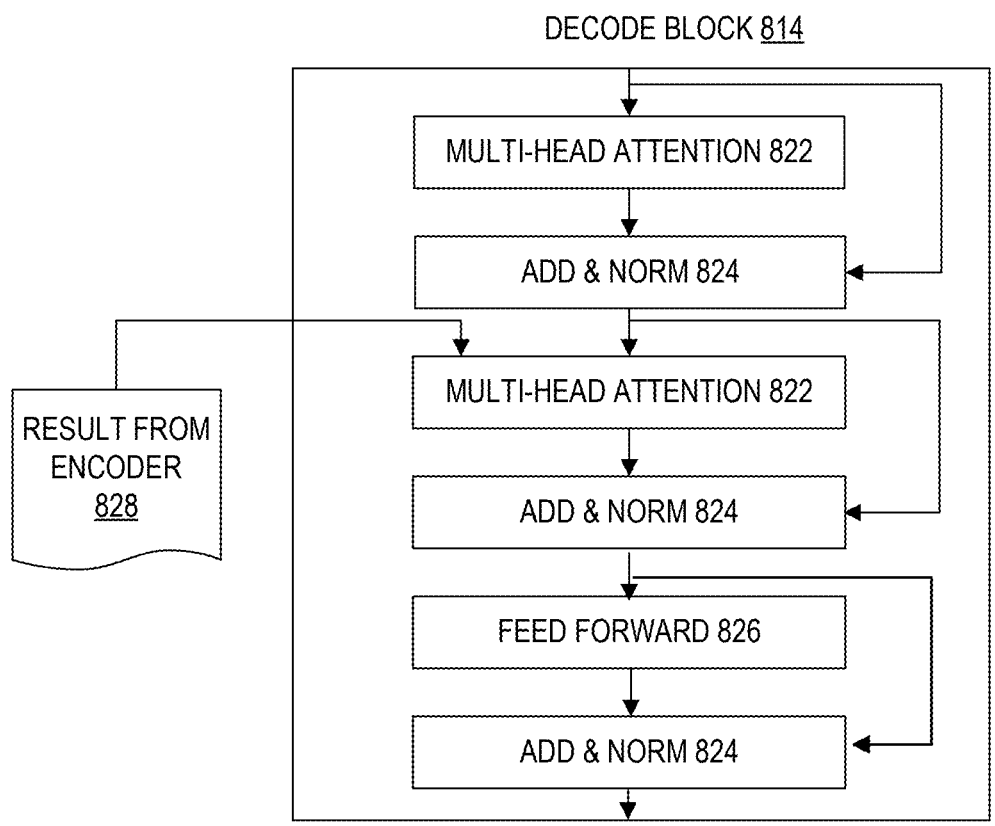

FIG. 8A, FIG. 8B, and FIG. 8C illustrates an example transformer architecture in accordance with some embodiments of the present technology. Examples of ML models that use a transformer neural network (e.g., transformer architecture 800) can include, e.g., generative pretrained transformer (GPT) models and Bidirectional Encoder Representations from Transformer (BERT) models. The transformer architecture 800, which is illustrated in FIG. 8A, FIG. 8B, and FIG. 8C, includes inputs 802, input embedding block 804, positional encodings 806, encoder 808 including encode blocks 810, decoder 812 including decode blocks 814, linear block 816, softmax block 818, and output probabilities 820.

Input embedding block 804 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 804 can be learned embeddings to convert the input tokens and output tokens to vectors of dimension that have the same dimension as the positional encodings, for example.

Positional encodings 806 provide information about the relative or absolute position of the tokens in the sequence. According to certain non-limiting examples, positional encodings 806 can be provided by adding positional encodings to the input embeddings at the inputs to the encoder 808 and decoder 812. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that doing so allows the model to extrapolate to sequence lengths longer than the ones encountered during training.

Encoder 808 can use stacked self-attention and pointwise, fully connected layers. Encoder 808 can be a stack of N identical layers (e.g., N=6), and each layer can be an encode block, as illustrated by encode block 810 shown in FIG. 8B. Each encode block 810 has two sub-layers: (i) a first sub-layer has a multi-head attention block 822 and (ii) a second sub-layer has a feed forward block 826, which can be a position-wise fully connected feed-forward network. The feed forward block 826 can use a rectified linear unit (ReLU).

Encoder 808 uses a residual connection around each of the two sub-layers, followed by an add and norm block 824, which performs normalization. For example, the output of each sub-layer can be LayerNorm(x+Sublayer(x)). To facilitate these residual connections, all sub-layers in the model, as well as the embedding layers, produce output data having a same dimension.

Similar to encoder 808, decoder 812 uses stacked self-attention and point-wise, fully connected layers. Decoder 812 can also be a stack of M identical layers (e.g., M=6), and each layer can be a decode block, as illustrated by decoder 812 shown in FIG. 8B. In addition to the two sub-layers (i.e., the sublayer with multi-head attention block 822 and the sub-layer with feed forward block 826) found in encode block 810, decode block 814 can include a third sub-layer, which performs multi-head attention over the output of the encoder stack. Similar to encoder 808, decoder 812 uses residual connections around each of the sub-layers, followed by layer normalization. Additionally, the sub-layer with multi-head attention block 822 can be modified in the decoder stack to prevent positions from attending to subsequent positions. This masking, combined with the fact that the output embeddings are offset by one position, can ensure that the predictions for position i can depend only on the known output data at positions less than i.

Linear block 816 can be a learned linear transformation. For example, when transformer architecture 800 is being used to translate from a first language into a second language, linear block 816 can project the output from the last decode softmax block 818 into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

Softmax block 818 then turns the scores from linear block 816 into output probabilities 820 (which add up to 1.0). In each position, the index provides for the word with the highest probability, and then maps that index to the corresponding word in the vocabulary. Those words then form the output sequence of transformer architecture 800. The softmax operation is applied to the output from linear block 816 to convert the raw numbers into output probabilities 820 (e.g., token probabilities).

Figure 9:
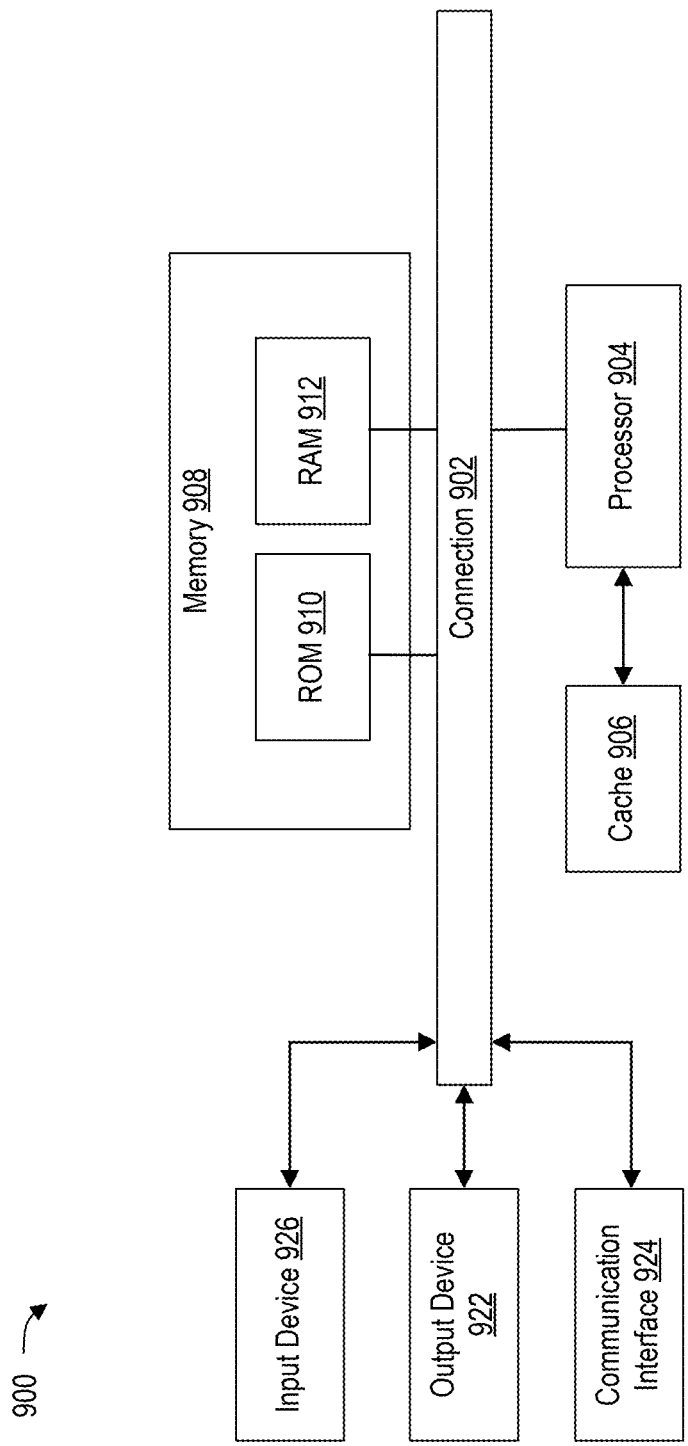
FIG. 9 shows an example of computing system that can implement various aspects of the present technology and any engine illustrated in FIG. 1 or any component thereof.

FIG. 9 shows an example of computing system 900, which can be, for example, any computing device making up any engine illustrated in FIG. 1 or any component thereof.

In some embodiments, computing system 900 is a single device, or a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

In some embodiments, computing system 900 may comprise one or more computing resources provisioned from a "cloud computing" provider, For example, AMAZON ELASTIC COMPUTE CLOUD ("AMAZON EC2"), provided by AMAZON, INC. of Seattle, Washington; SUN CLOUD COMPUTER UTILITY, provided by SUN MICROSYSTEMS, INC. of Santa Clara, California; AZURE, provided by MICROSOFT CORPORATION of Redmond, Washington, GOOGLE CLOUD PLATFORM, provided by ALPHABET, INC. of Mountain View, California, and the like.

Example computing system 900 includes at least one processing unit (CPU or processor) 904 and connection 902 that couples various system components including system memory 908, such as read-only memory (ROM) 910 and random access memory (RAM) 912 to processor 904. Memory 908 can be a volatile or non-volatile memory device, and can be a hard disk or other types of non-transitory computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

Memory 908 can include software services, servers, logic, etc., that when the code that defines such software is executed by the processor 904, it causes the system to perform a function. In some embodiments, a hardware service that performs a particular function can include the software component stored in a computer-readable medium in connection with the necessary hardware components, such as processor 904, connection 902, output device 922, etc., to carry out the function.

Computing system 900 can include a cache of high-speed memory 906 connected directly with, in close proximity to, or integrated as part of processor 904.

Connection 902 can be a physical connection via a bus, or a direct connection into processor 904, such as in a chipset architecture. Connection 902 can also be a virtual connection, networked connection, or logical connection.

Processor 904 can include any general purpose processor and a hardware service or software service stored in memory 908, configured to control processor 904 as well as a special-purpose processor where software instructions are incorporated into the actual processor design. Processor 904 may essentially be a completely self-contained computing system, containing multiple cores or processors, a bus, memory controller, cache, etc. A multi-core processor may be symmetric or asymmetric. Processor 904 can be physical or virtual.

To enable user interaction, computing system 900 includes an input device 926, which can represent any number of input mechanisms, such as a microphone for speech, a touch-sensitive screen for gesture or graphical input, keyboard, mouse, motion input, speech, etc. Computing system 900 can also include output device 922, which can be one or more of a number of output mechanisms known to those of skill in the art. In some instances, multimodal systems can enable a user to provide multiple types of input/output to communicate with computing system 900. Computing system 900 can include communication interface 924, which can generally govern and manage the user input and system output. There is no restriction on operating on any particular hardware arrangement, and therefore the basic features here may easily be substituted for improved hardware or firmware arrangements as they are developed.

In some embodiments, computing system 900 can refer to a combination of a personal computing device interacting with components hosted in a data center, where both the computing device and the components in the data center. In such examples, both the personal computing device and the components in the datacenter might have a processor, cache, memory, storage, etc.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, For example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.
Aspects The present technology includes computer-readable storage mediums for storing instructions, and systems for executing any one of the methods embodied in the instructions addressed in the aspects of the present technology presented below:

Aspect 1. A method comprising: receiving, by a generative response engine, a first user prompt from a client device, wherein the generative response engine is associated with a first state; determining, by the generative response engine using a first system prompt associated with the first state, the first user prompt corresponds to a second state different from than the first state; generating a second system prompt associated with the second state, wherein a tool of the generative response engine retrieves information associated with the second state to combine into the second system prompt; obtaining, by the generative response engine, a first response based on the first user prompt and the second system prompt associated with the second state; and providing the first response to the client device.

Aspect 2. The method of Aspect 1, wherein generating the second system prompt associated with the second state comprises: inserting second instructions associated with the second state into the first system prompt based on a reference to the second state in the first system prompt.

Aspect 3. The method of Aspect 2, wherein the second instructions include instructions relating to accessing a third state, wherein the third state cannot be accessed from the first state.

Aspect 4. The method of any of Aspects 1 to 3, wherein the first system prompt is generated based on a base system prompt that includes a plurality of references to different states and instructions associated with each state Aspect 5. The method of any of Aspects 1 to 4, wherein each state associated with the generative response engine is configured using a user interface for providing instructions associated with each state.

Aspect 6. The method of any of Aspects 1 to 5, wherein generating the second system prompt associated with the second state comprises: removing first instructions associated with the first state from the first system prompt.

Aspect 7. The method of any of Aspects 1 to 6, further comprising: receiving a second user prompt while the first system prompt is associated with the second state; and obtaining, from the generative response engine, a second response based on the second user prompt and the system prompt, wherein the second response is task associated with the second state.

Aspect 8. The method of any of Aspects 1 to 7, wherein the first system prompt and the second system prompt includes key-value pairs, and wherein the tool is configured to check each key-value pair for value changes.

Aspect 9. The method of any of Aspects 1 to 8, wherein the first response includes state change information to indicate the client device to update a user interface.

Aspect 10. The method of any of Aspects 1 to 9, wherein the first state is associated with a first persona and the second state is associated with a second persona.

Aspect 11. A computing device for configuring different states in a generative response engine. The computing device includes at least one memory and at least one processor coupled to the at least one memory and configured to: receive a first user prompt from a client device, wherein the generative response engine is associated with a first state; determine, by the generative response engine using a first system prompt associated with the first state, the first user prompt corresponds to a second state different from than the first state; generate a second system prompt associated with the second state, wherein a tool of the generative response engine retrieves information associated with the second state to combine into the second system prompt; obtain, by the generative response engine, a first response based on the first user prompt and the second system prompt associated with the second state; and provide the first response to the client device.

Aspect 12. The computing device of Aspect 11, wherein the at least one processor is configured to: insert second instructions associated with the second state into the first system prompt based on a reference to the second state in the first system prompt.

Aspect 13. The computing device of Aspect 12, wherein the second instructions include instructions relating to accessing a third state, wherein the third state cannot be accessed from the first state.

Aspect 14. The computing device of any of Aspects 11 to 13, wherein the first system prompt is generated based on a base system prompt that includes a plurality of references to different states and instructions associated with each state Aspect 15. The computing device of any of Aspects 11 to 14, wherein each state associated with the generative response engine is configured using a user interface for providing instructions associated with each state.

Aspect 16. The computing device of any of Aspects 11 to 15, wherein the at least one processor is configured to: remove first instructions associated with the first state from the first system prompt.

Aspect 17. The computing device of any of Aspects 11 to 16, wherein the at least one processor is configured to: receive a second user prompt while the first system prompt is associated with the second state; and obtain a second response based on the second user prompt and the system prompt, wherein the second response is task associated with the second state.

Aspect 18. The computing device of any of Aspects 11 to 17, wherein the first system prompt and the second system prompt includes key-value pairs, and wherein the tool is configured to check each key-value pair for value changes.

Aspect 19. The computing device of any of Aspects 11 to 18, wherein the first response includes state change information to indicate the client device to update a user interface.

Aspect 20. The computing device of any of Aspects 11 to 19, wherein the first state is associated with a first persona and the second state is associated with a second persona.

Aspect 21. A non-transitory computer-readable medium having stored thereon instructions that, when executed by at least one processor, cause the at least one processor to perform operations according to any of Aspects 1 to 10.

Aspect 22. An apparatus for performing a function, comprising one or more means for performing operations according to any of Aspects 1 to 10.

What is claimed is:

1. A method comprising:
   receiving, by a generative response engine, a first user prompt from a client device, wherein the generative response engine is associated with a first state;
   determining, by the generative response engine using a first system prompt associated with the first state, the first user prompt corresponds to a second state different from than the first state;
   generating a second system prompt associated with the second state, wherein a tool of the generative response engine retrieves information associated with the second state to combine into the second system prompt;
   obtaining, by the generative response engine, a first response based on the first user prompt and the second system prompt associated with the second state; and
   providing the first response to the client device.

2. The method of claim 1, wherein generating the second system prompt associated with the second state comprises:
   inserting second instructions associated with the second state into the first system prompt based on a reference to the second state in the first system prompt.

3. The method of claim 2, wherein the second instructions include instructions relating to accessing a third state, wherein the third state cannot be accessed from the first state.

4. The method of claim 1, wherein the first system prompt is generated based on a base system prompt that includes a plurality of references to different states and instructions associated with each state.

5. The method of claim 1, wherein each state associated with the generative response engine is configured using a user interface for providing instructions associated with each state.

6. The method of claim 1, wherein generating the second system prompt associated with the second state comprises:
   removing first instructions associated with the first state from the first system prompt.

7. The method of claim 1, further comprising:
   receiving a second user prompt while the first system prompt is associated with the second state; and
   obtaining, from the generative response engine, a second response based on the second user prompt and the system prompt, wherein the second response is task associated with the second state.

8. The method of claim 1, wherein the first system prompt and the second system prompt includes key-value pairs, and wherein the tool is configured to check each key-value pair for value changes.

9. The method of claim 1, wherein the first response includes state change information to indicate the client device to update a user interface.

10. The method of claim 1, wherein the first state is associated with a first persona and the second state is associated with a second persona.

11. A computing device for configuring different states in a generative response engine, comprising:
    at least one memory; and
    at least one processor coupled to the at least one memory and configured to:
      receive a first user prompt from a client device, wherein the generative response engine is associated with a first state;
      determine, using a first system prompt associated with the first state, the first user prompt corresponds to a second state different from than the first state;
      generate a second system prompt associated with the second state, wherein a tool of the generative response engine retrieves information associated with the second state to combine into the second system prompt;
      obtain a first response based on the first user prompt and the second system prompt associated with the second state; and
      provide the first response to the client device.

12. The computing device of claim 11, wherein the at least one processor is configured to: insert second instructions associated with the second state into the first system prompt based on a reference to the second state in the first system prompt.

13. The computing device of claim 12, wherein the second instructions include instructions relating to accessing a third state, wherein the third state cannot be accessed from the first state.

14. The computing device of claim 11, wherein the first system prompt is generated based on a base system prompt that includes a plurality of references to different states and instructions associated with each state.

15. The computing device of claim 11, wherein each state associated with the generative response engine is configured using a user interface for providing instructions associated with each state.

16. The computing device of claim 11, wherein the at least one processor is configured to:
remove first instructions associated with the first state from the first system prompt.

17. The computing device of claim 11, wherein the at least one processor is configured to:
receive a second user prompt while the first system prompt is associated with the second state; and
obtain, from the generative response engine, a second response based on the second user prompt and the system prompt, wherein the second response is task associated with the second state.

18. The computing device of claim 11, wherein the first system prompt and the second system prompt includes key-value pairs, and wherein the tool is configured to check each key-value pair for value changes.

19. The computing device of claim 11, wherein the first response includes state change information to indicate the client device to update a user interface.

20. The computing device of claim 11, wherein the first state is associated with a first persona and the second state is associated with a second persona.

* * * * *